United States Patent
Swierk et al.

(10) Patent No.: US 9,130,870 B1
(45) Date of Patent: Sep. 8, 2015

(54) METHODS FOR DETERMINING NETWORK TOPOLOGIES

(75) Inventors: Edward R. Swierk, Mountain View, CA (US); Guido Appenzeller, Menlo Park, CA (US)

(73) Assignee: Big Switch Networks, Inc., Santa Clara, CA (US)

( * ) Notice: Subject to any disclaimer, the term of this patent is extended or adjusted under 35 U.S.C. 154(b) by 364 days.

(21) Appl. No.: 13/088,262

(22) Filed: Apr. 15, 2011

(51) Int. Cl.
*H04L 12/715* (2013.01)
*H04L 12/755* (2013.01)
*H04L 12/701* (2013.01)
*H04L 12/26* (2006.01)

(52) U.S. Cl.
CPC ............... *H04L 45/46* (2013.01); *H04L 43/50* (2013.01); *H04L 45/021* (2013.01); *H04L 45/00* (2013.01)

(58) Field of Classification Search
CPC ......... H04J 3/14; H04L 43/50; H04L 45/021; H04L 45/46; H04L 45/00
USPC .................................. 370/329, 392, 242, 254
See application file for complete search history.

(56) References Cited

U.S. PATENT DOCUMENTS

| | | | |
|---|---|---|---|
| 6,674,727 B1 * | 1/2004 | Carroll et al. | 370/254 |
| 7,583,602 B2 * | 9/2009 | Bejerano et al. | 370/238 |
| 7,801,062 B2 * | 9/2010 | Oz et al. | 370/258 |
| 7,873,038 B2 * | 1/2011 | LaVigne et al. | 370/389 |
| 7,885,256 B1 * | 2/2011 | Yenamandra et al. | 370/389 |
| 7,894,372 B2 * | 2/2011 | Chu et al. | 370/255 |
| 7,970,394 B2 * | 6/2011 | Behroozi et al. | 455/423 |
| 8,134,964 B2 * | 3/2012 | Pan et al. | 370/329 |
| 8,374,175 B2 * | 2/2013 | Riley | 370/386 |
| 2004/0218611 A1 * | 11/2004 | Kim | 370/401 |
| 2007/0174309 A1 * | 7/2007 | Pettovello | 707/100 |
| 2009/0259652 A1 * | 10/2009 | Yamane et al. | 707/5 |
| 2010/0094994 A1 * | 4/2010 | Yoshida | 709/224 |
| 2010/0164685 A1 * | 7/2010 | Pering et al. | 340/5.83 |
| 2010/0290467 A1 * | 11/2010 | Eisenhauer et al. | 370/392 |
| 2011/0255418 A1 * | 10/2011 | van Greunen et al. | 370/242 |
| 2011/0292832 A1 * | 12/2011 | Bottari et al. | 370/254 |
| 2012/0059930 A1 * | 3/2012 | Devarakonda et al. | 709/224 |

OTHER PUBLICATIONS

Pfaff et al., OpenFlow Switch Specification, Dec. 31, 2009, 42 pages.
McKeown et al., OpenFlow: Enabling Innovation in Campus Networks, Mar. 14, 2008, 6 pages.
Cisco Systems, Cisco Catalyst 6500 Architecture, 1992-2007, 28 pages.

(Continued)

*Primary Examiner* — Alpus H Hsu
*Assistant Examiner* — Anthony Luo
(74) *Attorney, Agent, or Firm* — Treyz Law Group; Michael H. Lyons

(57) ABSTRACT

A network may include switches that have controller clients that are controlled from one or more controller servers. Clusters of the switches that have the controller clients may be isolated from other clusters by switches without the controller clients. The controller server may use graph searches to identify the clusters. The controller server may use information on the cluster topology of switches containing controller clients along with information in per-switch forwarding databases to generate per-cluster forwarding databases. The controller server may use the per-cluster forwarding databases in generating flow tables for the network switches that direct the switches to forward packets along desired paths through the network.

15 Claims, 18 Drawing Sheets

(56) References Cited

OTHER PUBLICATIONS

Casado et al., "SANE: A Protection Architecture for Enterprise Networks," Usenix Security, Aug. 2006 (15 pages).
Casado et al., "Ethane: Taking Control of the Enterprise," Conference of Special Interest Group on Data Communication (SIGCOMM), Japan, Aug. 2007 (12 pages).
Koponen et al., "Onix: A Distributed Control Platform for Large-scale Production Networks," Usenix Security, Oct. 2010 (14 pages).
Sherwood et al. "FlowVisor: A Network Virtualization Layer," Open Flow Technical Reports, Oct. 14, 2009 (Abstract and 14 pages) [Retrieved on Jan. 4, 2011]. Retrieved from the Internet:<URL: http://openflowswitch.org/downloads/ technicalreports/openflow-tr-2009-1-flowvisor.pdf.

* cited by examiner

| PHYSICAL INPUT PORT | SOURCE ETHERNET ADDRESS | DESTINATION ETHERNET ADDRESS | SOURCE IP ADDRESS | DESTINATION IP ADDRESS | SOURCE TCP PORT | DESTINATION TCP PORT | ACTION |
|---|---|---|---|---|---|---|---|
| * | * | 00:1FAB | * | * | * | * | SEND TO PORT 3 |
| * | * | * | * | 172.12.3.4 | * | * | SEND TO PORT 4 |
| * | * | * | * | * | * | 80 | DROP |

FIG. 7B

SWITCH FEATURES REPLY MESSAGE

LLDP MESSAGE

PACKET OUT MESSAGE

PACKET IN MESSAGE

250

| SOURCE SWITCH | SOURCE PORT | DESTINATION SWITCH | DESTINATION PORT | CLUSTER ID |
|---|---|---|---|---|
| SW1 | A | SW3 | Q | – |
| SW3 | Q | SW1 | A | – |
| SW3 | R | SW2 | W | – |
| SW4 | D | SW5 | E | – |
| SW5 | E | SW4 | D | – |

| SOURCE SWITCH | SOURCE PORT | DESTINATION SWITCH | DESTINATION PORT | CLUSTER ID |
|---|---|---|---|---|
| SW1 | A | SW3 | Q | I |
| SW3 | Q | SW1 | A | I |
| SW3 | R | SW2 | W | I |
| SW4 | D | SW5 | E | II |
| SW5 | E | SW4 | D | II |

260
| HOST | PORT |
|------|------|
| EH1  | D    |
| EH2  | A    |
| ⋮    | ⋮    |

SWITCH SW1

260
| HOST | PORT |
|------|------|
| EH1  | Q    |
| EH2  | R    |
| ⋮    | ⋮    |

SWITCH SW3

260
| HOST | PORT |
|------|------|
| EH1  | W    |
| EH2  | X    |
| ⋮    | ⋮    |

SWITCH SW2

FIG. 17

270
| HOST | SWITCH | PORT |
|------|--------|------|
| EH1  | SW1    | D    |
| EH2  | SW2    | X    |
| ⋮    | ⋮      | ⋮    |

CLUSTER I

270
| HOST | SWITCH | PORT |
|------|--------|------|
| EH1  | SW4    | Y    |
| EH2  | SW5    | F    |
| ⋮    | ⋮      | ⋮    |

CLUSTER II

FIG. 18

METHODS FOR DETERMINING NETWORK TOPOLOGIES

BACKGROUND

This relates to communications networks, and more particularly, to obtaining information on network topologies in communications networks.

Packet-based networks such as the internet and local data networks that are connected to the internet include network switches. Network switches are used in forwarding packets from packet sources to packet destinations.

It can be difficult or impossible to control the switches of one vendor using the equipment of another vendor. This is because the switch equipment of one vendor may use a different operating system and set of control procedures than the switch equipment of another vendor. To address the challenges associated with controlling different types of switch platforms, cross-platform protocols have been developed. These protocols allow centralized control of otherwise incompatible switches.

Cross-platform controller clients can be included on the switches in a network. The controller clients are able to communicate with a corresponding controller server over network paths. Because the controller clients can be implemented on a variety of switch hardware, it is possible for a single controller to control switch equipment that might otherwise be incompatible.

Each network switch on which a controller client has been implemented may be provided with a flow table with entries that specify how packets are to be forwarded by that switch. To provide network switches with appropriate flow tables, the controller server may need to gather information on the topology of the network in which the network switches are operating. Without information on the topology of the network, the controller server may not be able to determine how to construct appropriate flow tables.

It would therefore be desirable to be able to provide improved arrangements for gathering information on the topology of a communications network from the network switches in a communications network.

SUMMARY

Network switches may be configured using flow tables. Flow table entries may contain header fields and associated actions. When a packet is received by a network switch, the network switch can compare fields in the packet to fields in the flow table entries. The network switch can take appropriate actions when matches are detected. For example, the network switch can forward packets to an appropriate switch port.

A controller server can be used to control the network switches. Each of the network switches may contain a controller client. The controller server and the controller clients may use network protocol stacks to communicate over network connections. For example, the controller server can distribute flow table entries to the controller clients that direct the network switches to perform desired packet processing operations.

The controller server can determine the topology of a network and can gather information on the capacities of network switches and other network switch capabilities. The controller server may use graph searches to determine the cluster topology of switches containing controller clients. The controller server may use the cluster topology of switches containing controller clients along with information in per-switch forwarding databases to generate per-cluster forwarding databases. The controller server may use the cluster topology of switches containing controller clients along with per-cluster forwarding databases to assist in generating flow tables for the network switches that direct the switches to forward packets along desired paths through the network.

Further features of the present invention, its nature and various advantages will be more apparent from the accompanying drawings and the following detailed description.

BRIEF DESCRIPTION OF THE DRAWINGS

FIG. 7B is a diagram of an illustrative flow table of the type that may be used by a packet processing system showing three illustrative types of packet forwarding that may be performed based on the flow table entries of the flow table in accordance with an embodiment of the present invention.

FIG. 15 is a diagram of an illustrative network topology data structure in accordance with an embodiment of the present invention.

FIG. 16 is a diagram of an illustrative network topology data structure with updated cluster information in accordance with an embodiment of the present invention.

FIG. 17 is a diagram of illustrative per-switch forwarding databases in accordance with an embodiment of the present invention.

FIG. 18 is a diagram of illustrative per-cluster forwarding databases in accordance with an embodiment of the present invention.

DETAILED DESCRIPTION

Networks such as the internet and the local and regional networks that are coupled to the internet rely on packet-based switches. These switches, which are sometimes referred to herein as network switches, packet processing systems, or packet forwarding systems can forward packets based on address information. In this way, data packets that are transmitted by a packet source may be delivered to a packet destination. In network terms, packet sources and destinations are sometimes referred to as end hosts. Examples of end hosts are personal computers, servers, and other computing equipment.

It is not uncommon for networks to include equipment from multiple vendors. As an example, a network for a university or corporate campus might include core switches from one vendor, edge switches from another vendor, and aggregation switches from yet another vendor. Network switches from different vendors can be interconnected to form a packet forwarding network, but can be difficult to manage in a centralized fashion due to incompatibilities between their operating systems and control protocols.

These potential incompatibilities can be overcome by incorporating a common cross-platform control module (sometimes referred to herein as a controller client) into each network switch. A centralized cross-platform controller server may interact with each of the control clients over respective network links. The use of a cross-platform controller server and corresponding controller clients allows potentially disparate network switch equipment to be centrally managed.

Figure 1:
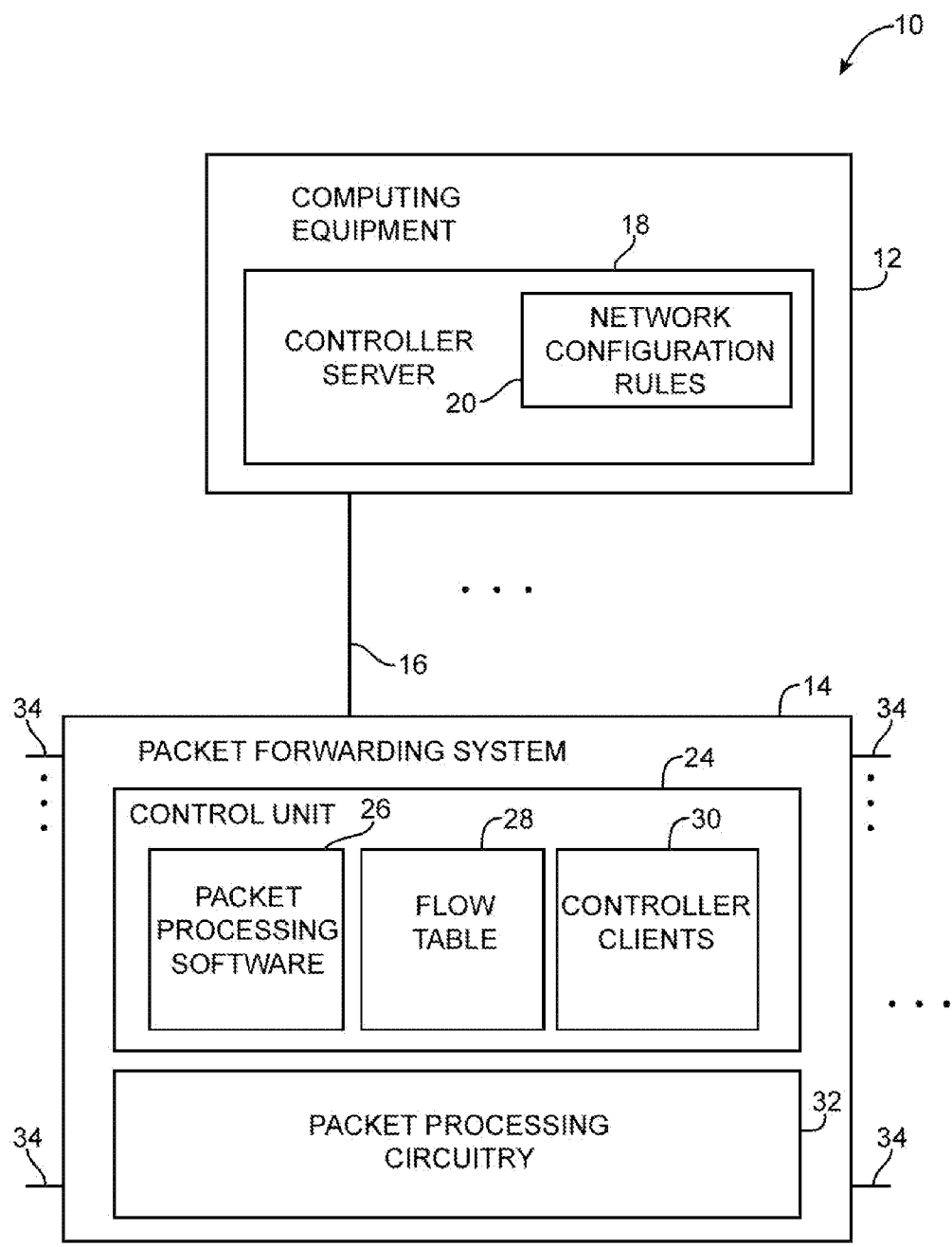
FIG. 1 is a diagram of an illustrative network that includes a controller and a packet forwarding system in accordance with an embodiment of the present invention.

With one illustrative configuration, which is sometimes described herein as an example, centralized control is provided by one or more controller servers such as controller server 18 of FIG. 1. Control server 18 may be implemented on a stand-alone computer, on a cluster of computers, on a set of computers that are distributed among multiple locations, on hardware that is embedded within a network switch, or on other suitable computing equipment 12. Controller server 10 can run as a single process on a single computer or can be distributed over several hosts for redundancy. The use of a distributed arrangement may help provide network 10 with resiliency against unexpected network partitions (e.g., a situation in which a network link between two campuses is disrupted).

In distributed controller arrangements, controller nodes can exchange information using an intra-controller protocol. For example, if a new end host connects to network hardware (e.g., a switch) that is only connected to a first controller node, that first controller node may use the intra-controller protocol to inform other controller nodes of the presence of the new end host. If desired, a switch or other network component may be connected to multiple controller nodes. Arrangements in which a single controller server is used to control a network of associated switches are sometimes described herein as an example.

Controller server 18 of FIG. 1 may gather information about the topology of network 10. For example, controller server 18 may send Link Layer Discovery Protocol (LLDP) probe packets through the network to discover the topology of network 10. Controller server 18 may use information on network topology and information on the capabilities of network equipment to determine appropriate paths for packets flowing through the network. Once appropriate paths have been identified, controller server 18 may send corresponding settings data to the hardware in network 10 to ensure that packets flow through the network as desired. Network configuration operations such as these may be performed during system setup operations, continuously in the background, or in response to the appearance of newly transmitted data packets (i.e., packets for which a preexisting path has not been established).

Controller server 18 may be used to implement network configuration rules 20. Rules 20 may specify which services are available to various network entities. As an example, rules 20 may specify which users (or type of users) in network 10 may access a particular server. Rules 20 may, for example, be maintained in a database at computing equipment 12.

Controller server 18 and controller clients 30 at respective network switches 14 may use network protocol stacks to communicate over network links 16.

Each switch (packet forwarding system) 14 may have input-output ports 34. Cables may be used to connect pieces of equipment to ports 34. For example, end hosts such as personal computers, web servers, and other computing equipment may be plugged into ports 34. Ports 34 may also be used to connect one of switches 14 to other switches 14.

Packet processing circuitry 32 may be used in forwarding packets from one of ports 34 to another of ports 34 and may be used in performing other suitable actions on incoming packets. Packet processing circuit 32 may be implemented using one or more integrated circuits such as dedicated high-speed switch circuits and may serve as a hardware data path. If desired, packet processing software 26 that is running on control unit 24 may be used in implementing a software data path.

Control unit 24 may include processing and memory circuits (e.g., one or more microprocessors, memory chips, and other control circuitry) for storing and running control software. For example, control unit 24 may store and run software such as packet processing software 26, may store flow table 28, and may be used to support the operation of controller clients 30.

Controller clients 30 and controller server 18, may be compliant with a network switch protocol such as the OpenFlow protocol (see, e.g., OpenFlow Switch Specification version 1.0.0). One or more clients among controller clients 30 may also be compliant with other protocols (e.g., the Simple Network Management Protocol). Using the OpenFlow protocol or other suitable protocols, controller server 18 may provide controller clients 30 with data that determines how switch 14 is to process incoming packets from input-output ports 34.

With one suitable arrangement, flow table data from controller server 18 may be stored in a flow table such as flow table 28. The entries of flow table 28 may be used in configuring switch 14 (e.g., the functions of packet processing circuitry 32 and/or packet processing software 26). In a typical scenario, flow table 28 serves as cache storage for flow table entries and a corresponding version of these flow table entries is embedded within the settings maintained by the circuitry of packet processing circuitry 32. This is, however, merely illustrative. Flow table 28 may serve as the exclusive storage for flow table entries in switch 14 or may be omitted in favor of flow table storage resources within packet processing circuitry 32. In general, flow table entries may be stored using any suitable data structures (e.g., one or more tables, lists, etc.). For clarity, the data of flow table 28 (whether maintained in a database in control unit 24 or embedded within the configuration of packet processing circuitry 32) is referred to herein as forming flow table entries (e.g., rows in flow table 28).

Figure 2:
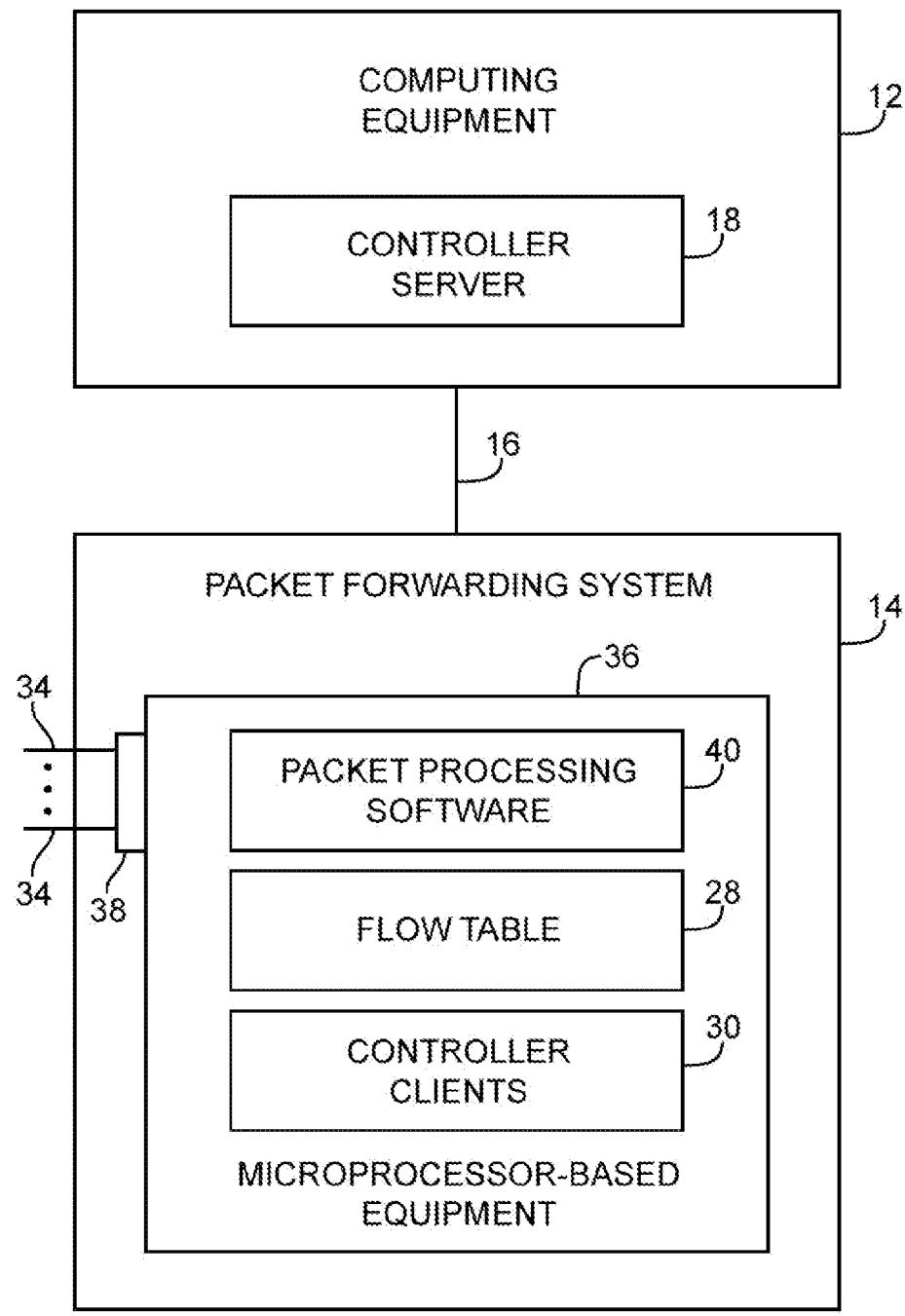
FIG. 2 is a diagram showing how a packet forwarding system may be implemented using microprocessor-based equipment that runs a packet processing engine in accordance with an embodiment of the present invention.

If desired, switch 14 may be implemented using a general purpose processing platform that runs control software and that omits packet processing circuitry 32 of FIG. 2. This type of configuration is shown in FIG. 2. As shown in the illustrative arrangement of FIG. 2, controller server 18 on computing equipment 12 may communicate with controller clients 30 on switch (packet forwarding system) 14 over network link 16. Controller server 18 may, for example, convey flow table entries to controller clients 30 that are maintained in flow table 28. Packet processing software 40 may use network interface 38 to forward and otherwise process packets (e.g., packets transmitted and received using ports 34). Network interface 38 may be implemented using one or more network interface cards that are plugged into a system board in switch 14 (as an example).

Figure 3:
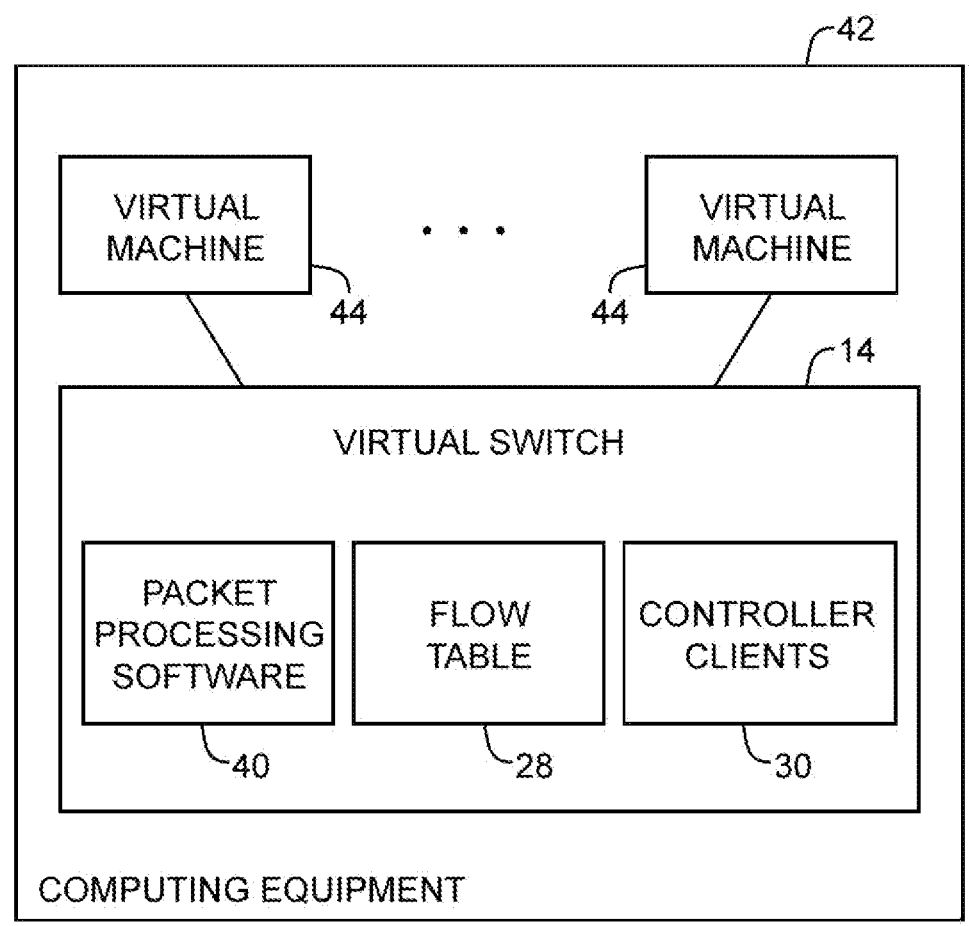
FIG. 3 is a diagram showing how a virtual switch may be used to perform the functions of a packet forwarding system in accordance with an embodiment of the present invention.

Another illustrative type of network switch is shown in FIG. 3. In the example of FIG. 3, computing equipment 42 is being used to implement virtual machines 44. Computing equipment 42 may be, for example, a server that is based on one or more computers and virtual machines 44 may be used to implement web servers or other online services. In a typical scenario, a customer who has purchased virtual machine services may be assigned a number of virtual machines 44. To ensure that these virtual machines can communicate with each other, some of the resources of computing equipment 42 are used to implement network switch (e.g., a packet processing system based on software such as packet processing software 40, flow table 28, and controller clients 30). Switch 14, which may sometimes be referred to as a virtual switch, forms a type of packet forwarding system that can forward packets between respective virtual machines 44.

Figure 4:
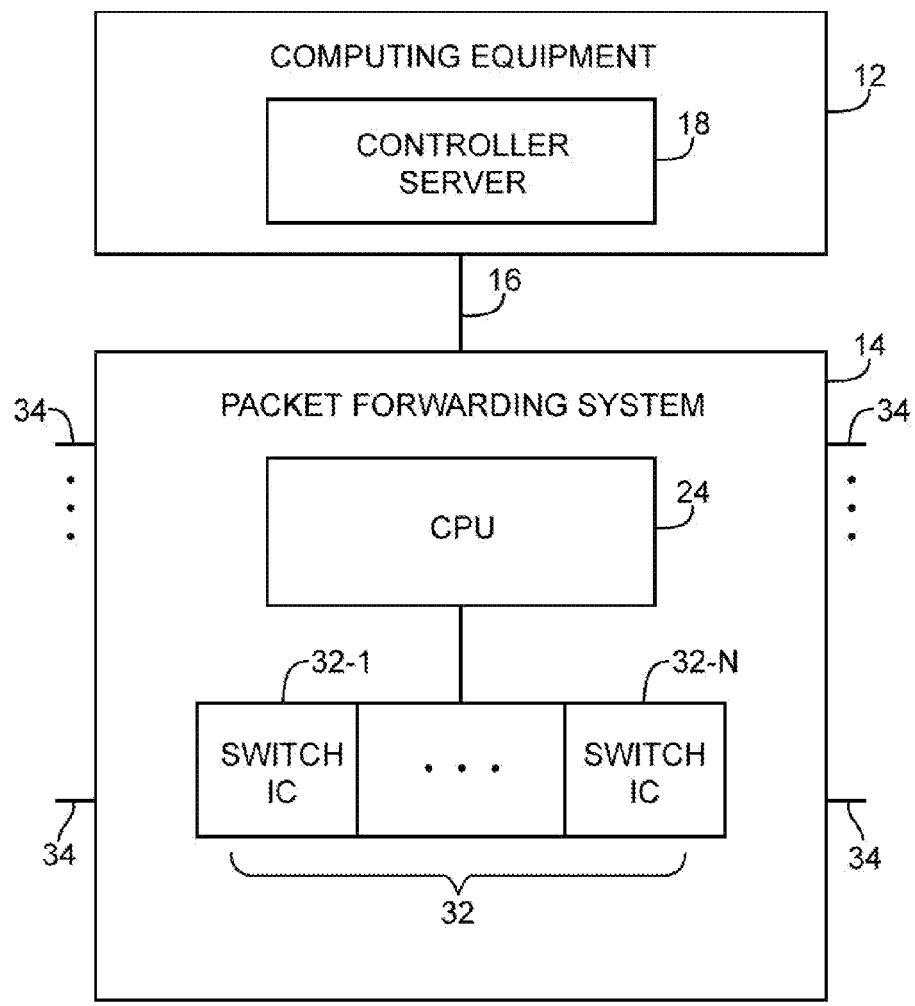
FIG. 4 is a diagram of a packet forwarding system and associated controller in which the packet forwarding system includes a control unit and associated switching integrated circuits in accordance with an embodiment of the present invention.

Network switches such as network switch 14 of FIG. 1 may be implemented using control circuitry that is coupled to one or more high-speed switching integrated circuits ("switch ICs"). This type of configuration is shown in FIG. 4. As shown in FIG. 4, controller server 18 on computing equipment 12 may communicate with network switch 14 via path 16. Switch 14 may include processing circuitry 24 and one or more associated switch ICs 32 such as switch IC 32-1 . . . switch IC 32-N. Control circuitry 24 may be, for example, based on a microprocessor and memory. Switch ICs 32-1 . . . 32-N may be dedicated switching circuits that are capable of handling packet processing tasks at high speeds. As an example, control circuitry 24 may be based on a 500 MHz microprocessor and switch ICs 32-1 . . . 32-N may be capable of handling data from 48 of input-output ports 34, each of which has an associated data rate of 1-10 Gbps (as an example).

Figure 5:
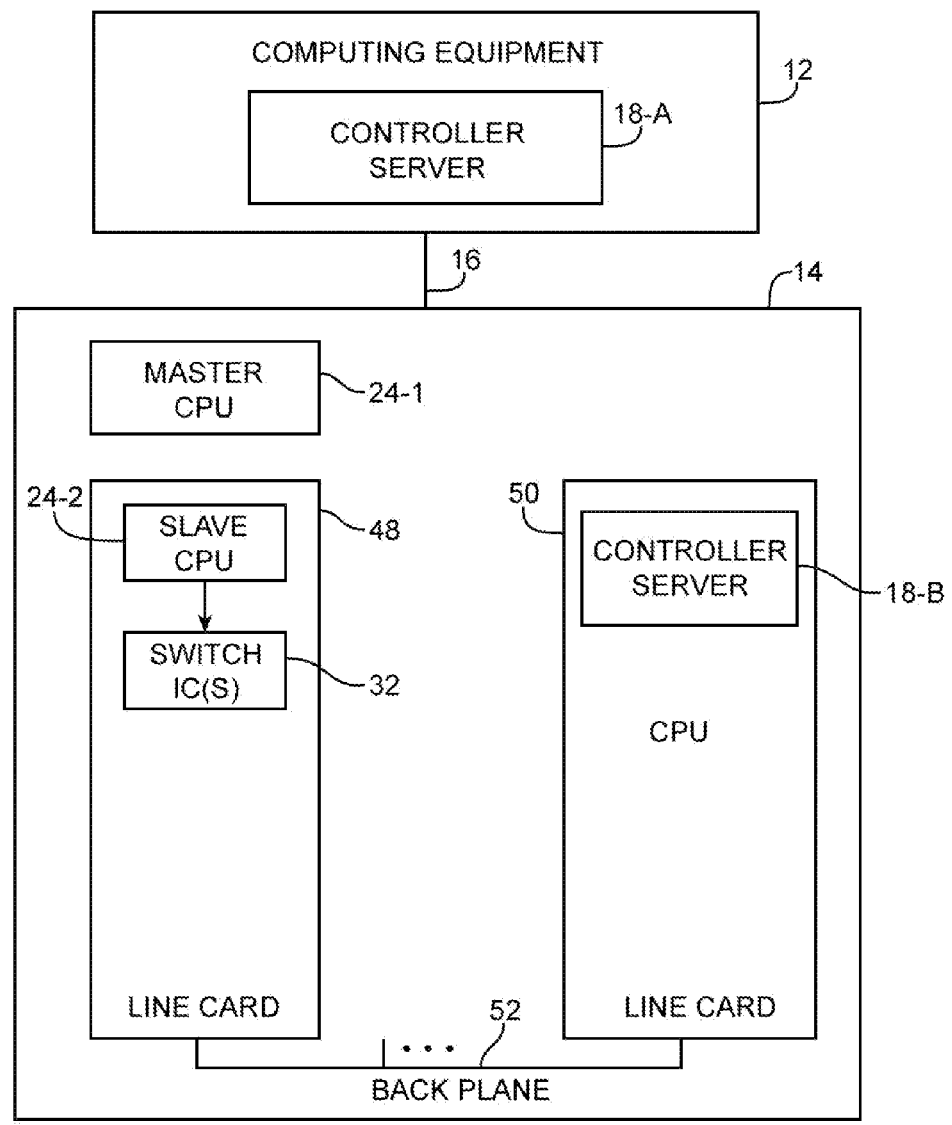
FIG. 5 is a diagram of a network in which a packet forwarding system has master and slave controllers and in which a controller server may be implemented on remote computing equipment or on a line card in the packet forwarding system in accordance with an embodiment of the present invention.

Another illustrative switch architecture that may be used in implementing network switch 14 of FIG. 1 is shown in FIG. 5. In the FIG. 5 example, switch (packet forwarding system) 14 may include a master processor such as processor 24-1 and one or more associated slave processors such as slave processor 24-2. Switch ICs 32 and slave processors such as processor 24-2 may be implemented on line cards such as line card 48. One or more line cards such as line card 50 may contain processing circuitry (e.g., a microprocessor and memory). Line cards 48 and 50 may be interconnected using backplane 52.

With an arrangement of the type shown in FIG. 5, the controller server may be implemented using the processing resources of a line card. For example, the controller server may be implemented on line card 50 as illustrated by controller server 18-B of FIG. 5. If desired, the controller server may be implemented on computing equipment 12 (e.g., as controller server 18-A of FIG. 5). Controller server 18-A or controller server 18-B may communicate with controller clients 30 that are implemented using processors such as processor 24-1 and/or 24-2. Communications between controller server 18-A and the controller clients may take place over network connection 16. Communications between controller server 18-B and the controller clients may take place over backplane 52 (e.g., over a network connection using a protocol such as TCP/IP).

Figure 6:
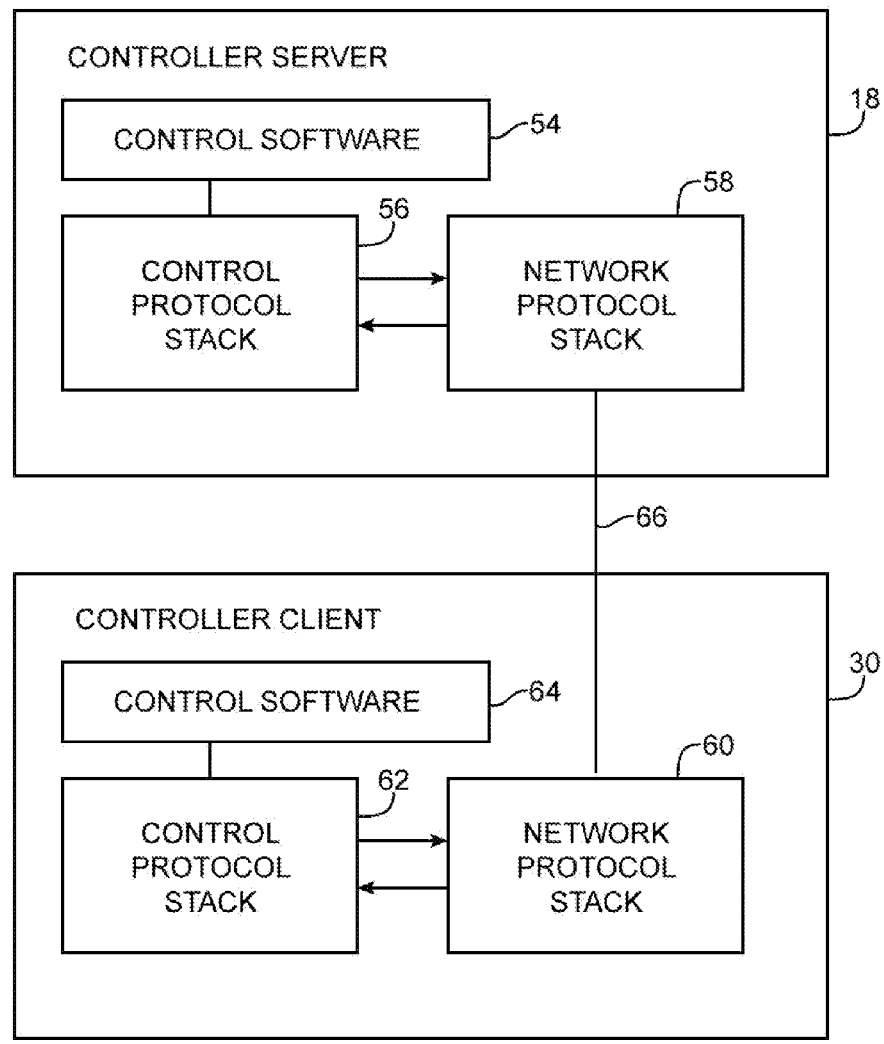
FIG. 6 is a diagram of a controller server and controller client that are communicating over a network connection in accordance with an embodiment of the present invention.

As shown in FIG. 6, controller server 18 and controller client 30 may communicate over network path 66 using network protocol stacks such as network protocol stack 58 and network protocol stack 60. Stacks 58 and 60 may be, for example Linux TCP/IP stacks or the TCP/IP stack in the VxWorks operating system (as examples). Path 66 may be, for example, a path that supports a network connection between switch 14 and external equipment (e.g., network path 16 of FIG. 1) or may be a path that supports a network connection in backplane 52 in switch 14, as shown in FIG. 5. Arrangements in which path 66 is network path such as path 16 are sometimes described herein as an example.

Control protocol stack 56 serves as an interface between network protocol stack 58 and control software 54. Control protocol stack 62 serves as an interface between network protocol stack 60 and control software 64. During operation, when controller server 18 is communicating with controller client 30, control protocol stacks 56 generate and parse control protocol messages (e.g., control messages to activate a port or to install a particular flow table entry into flow table 28). By using arrangements of the type shown in FIG. 6, a network connection is formed over the link between controller server 18 and controller client 30. Controller server 18 and controller client 30 can communicate using a Transmission Control Protocol (TCP) or User Datagram Protocol (UDP) over Internet Protocol (IP) network connection. Examples of control protocols that may be used when communicating between controller server 18 and controller clients 30 over the network connection include SNMP and OpenFlow protocol stack version 1.0.0 (as examples).

Flow table 28 contains flow table entries (e.g., rows in the table) that have multiple fields (sometimes referred to as header fields). The fields in a packet that has been received by switch 14 can be compared to the fields in the flow table. Each flow table entry may have associated actions. When there is a match between the fields in a packet and the fields in a flow table entry, the corresponding action for that flow table entry may be taken.

Figure 7A:
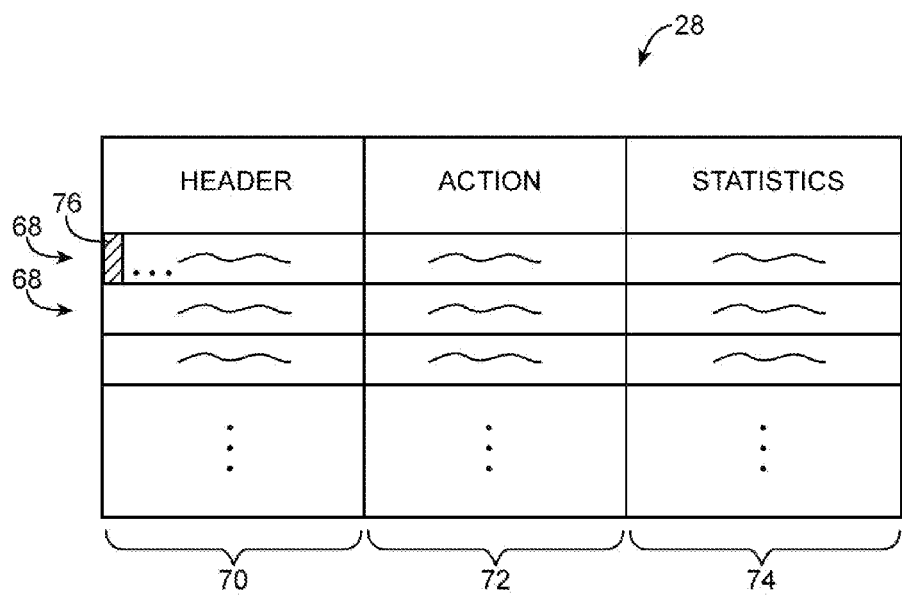
FIG. 7A is a diagram of an illustrative flow table of the type that may be used by a packet processing system in accordance with an embodiment of the present invention.

An illustrative flow table is shown in FIG. 7. As shown in FIG. 7A, table 28 may have flow table entries (row) 68. Each flow table entry may be associated with header 70, action 72, and statistics 74. Headers 70 may each include multiple header fields 76. The action in each flow table entry indicates what action switch 14 is to perform on the packet when a match is detected between the fields in the packet and the corresponding fields in the header of that flow table entry. Switch 14 may maintain statistical data (counter values) in the statistics portion of flow table 28 that can be queried by controller server 18 when it is desired to obtain information on the performance of switch 14.

The header fields in header 70 (and the corresponding fields in each incoming packet) may include the following fields: ingress port (i.e., the identity of the physical port in switch 14 through which the packet is being received), Ethernet source address, Ethernet destination address, Ethernet type, virtual local area network (VLAN) id, VLAN priority, IP source address, IP destination address, IP protocol, IP ToS (type of service) bits, Transport source port/Internet Control Message Protocol (ICMP) Type (sometimes referred to as source TCP port), and Transport destination port/ICMP Code (sometimes referred to as destination TCP port). Other fields may be used if desired.

Each flow table entry (flow entry) is associated with zero or more actions that dictate how the switch handles matching packets. If no forward actions are present, the packet is preferably dropped. The actions that may be taken by switch 14 when a match is detected between packet fields and the header fields in a flow table entry may include the following actions: forward (e.g., ALL to send the packet out on all interfaces, not including the incoming interface, CONTROLLER to encapsulate and send the packet to the controller server, LOCAL to send the packet to the local networking stack of the switch, TABLE to perform actions in flow table 28, IN_PORT to send the packet out of the input port, NORMAL to process the packet with a default forwarding path that is supported by the switch using, for example, traditional level 2, VLAN, and level 3 processing, and FLOOD to flood the packet along the minimum spanning tree, not including the incoming interface). Additional actions that may be taken by switch 14 include: an enqueue action to forward a packet through a queue attached to a port and a drop action (e.g., to drop a packet that matches a flow table entry with no specified action). Modify-field actions may also be supported by switch 14. Examples of modify-field actions that may be taken include: Set VLAN ID, Set VLAN priority, Strip VLAN header, Modify Ethernet source MAC (Media Access Control) address, Modify Ethernet destination MAC address, Modify IPv4 source address, Modify IPv4 ToS bits, Modify transport destination port.

FIG. 7B is an illustrative flow table having three flow table entries. The entries include fields with wildcards (e.g., "*" symbols). When a wildcard is present in a particular field, all incoming packets will be considered to form a "match" with respect to the field, regardless of the particular value of the field in the incoming packet.

The entry of the first row of the FIG. 7B table directs the switch in which the flow table entry is operating to perform Ethernet switching. In particular, incoming packets with matching Ethernet destination addresses are forwarded to port 3.

The entry of the second row of table of FIG. 7B illustrates how a switch may be configured to perform internet routing (i.e., packets are forwarded based on their destination IP address).

The third row of the table of FIG. 7B contains an entry that illustrates how a switch may be configured to perform firewalling. When a packet is received that has a destination IP port value of 80, that packet is dropped (i.e., the switch is configured to serve as a firewall that blocks port 80 traffic).

Flow table entries of the type shown in FIG. 7B may be loaded into a switch 14 by controller server 18 during system setup operations or may be provided to a switch 14 from controller server 18 in real time in response to receipt and processing of packets at controller server 18 from switch 14. In a network with numerous switches 14, each switch can be provided with appropriate flow table entries to form a path through the network.

Figure 8:
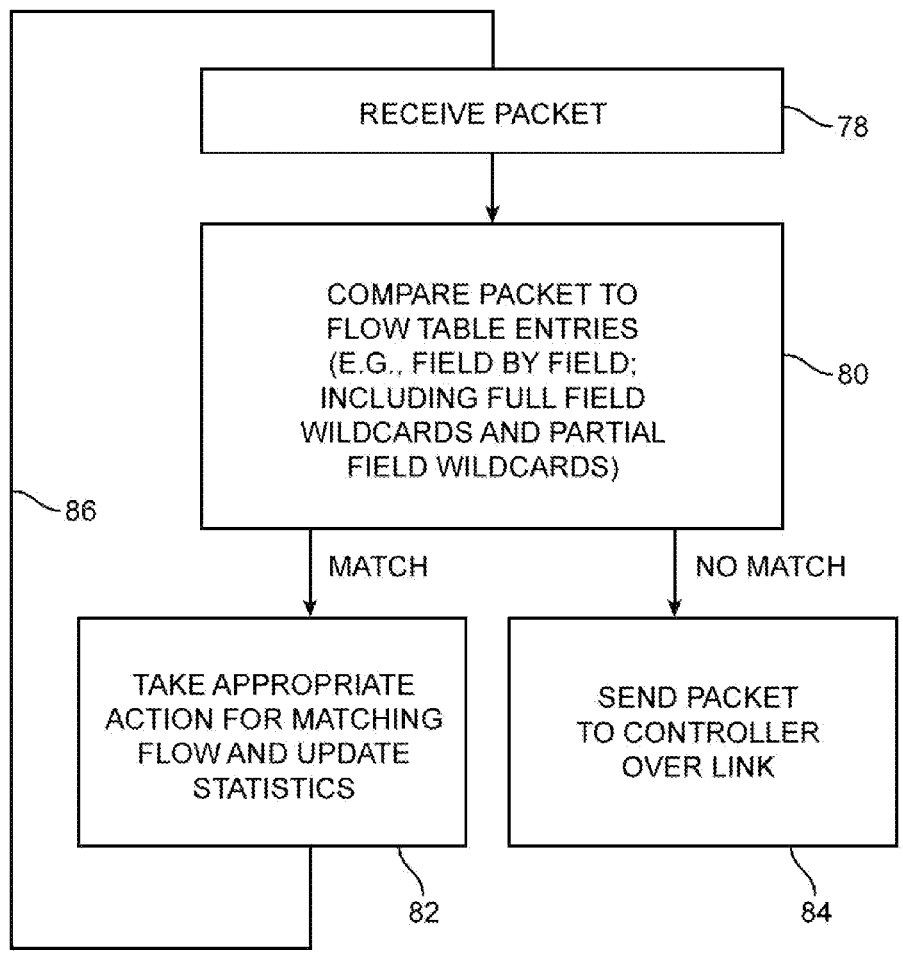
FIG. 8 is a flow chart of illustrative steps involved in processing packets in a packet processing system in accordance with an embodiment of the present invention.

Illustrative steps that may be performed by switch 14 in processing packets that are received on input-output ports 34 are shown in FIG. 8. At step 78, switch 14 receives a packet on one of its ports (e.g., one of input-output ports 34 of FIG. 1).

At step 80, switch 14 compares the fields of the received packet to the fields of the flow table entries in the flow table 28 of that switch to determine whether there is a match. Some fields in a flow table entry may contain complete values (i.e., complete addresses). Other fields may contain wildcards (i.e., fields marked with the "don't care" wildcard character of "*"). Yet other fields may have partially complete entries (i.e., a partial address that is partially wildcarded). Some fields may use ranges (e.g., by restricting a TCP port number to a value between 1 and 4096) and in effect use the range to implement a type of partial wildcarding. In making field-by-field comparisons between the received packet and the flow table entries, switch 14 can take into account whether or not each field in the flow table entry contains a complete value without any wildcarding, a partial value with wildcarding, or a wildcard character (i.e., a completely wildcarded field).

If it is determined during the operations of step 80 that there is no match between the fields of the packet and the corresponding fields of the flow table entries, switch 14 may send the packet to controller server 18 over link 16 (step 84).

If it is determined during the operations of step 80 that there is a match between the packet and a flow table entry, switch 14 may perform the action that is associated with that flow table entry and may update the counter value in the statistics field of that flow table entry (step 82). Processing may then loop back to step 78, so that another packet may be processed by switch 14, as indicated by line 86.

Figure 9:
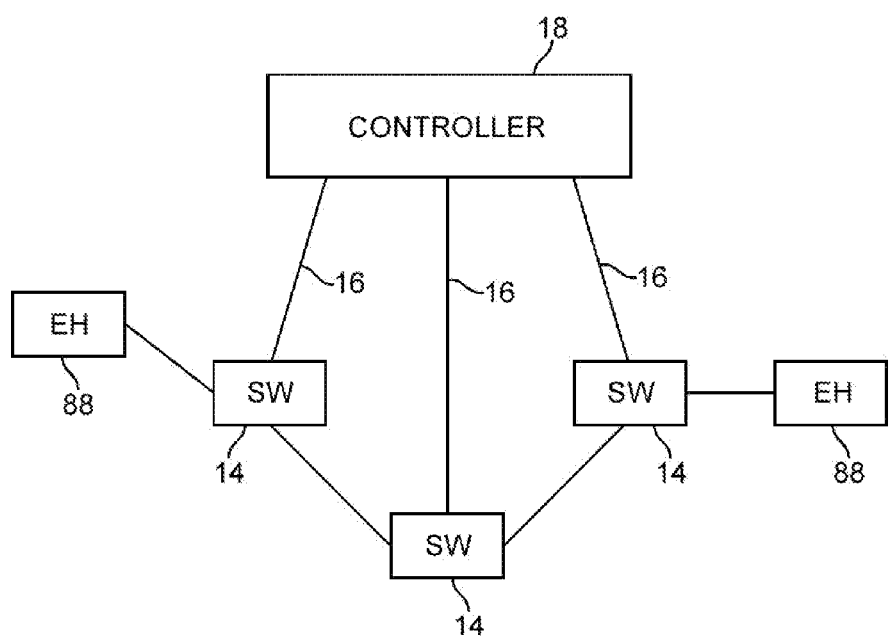
FIG. 9 is a diagram of a network showing how a controller can control multiple network switches in accordance with an embodiment of the present invention.

FIG. 9 is a diagram of an illustrative network showing how controller server 18 may control multiple switches 14 using multiple associated network connections 16. In the illustrative network shown in FIG. 9, a first end host (the end host 88 on the left side of FIG. 9) is communicating with a second end host (the end host 88 on the right side of FIG. 9). End hosts 88 may be computers (e.g., personal computers), servers, clusters of computers, set-top boxes, handheld devices, or any other computing equipment. During part of the communications between end hosts 88, the first end host may be serving as a packet source and the second end host may be serving as a packet destination. At other times, roles may be reversed, so that the second end host is serving as a packet source while the first end host is serving as a packet destination.

To ensure that packets are forwarded correctly through the network, controller 18 may provide each of the switches shown in FIG. 9 with appropriate flow table entries. With one suitable arrangement, controller server 18 may supply switches 14 with flow table entries in response to receipt of a packet that has been sent to controller server 18 from a switch that did not detect a match between an incoming packet and its flow table entries. When controller server 18 receives the packet, controller server 18 can use network configuration rules 20 (FIG. 1), information from the packet, network topology information, and other information in determining appropriate entries for flow tables 28 for switches 14. Controller server 18 may then provide the flow table entries to switches 14 to configure the switches for forwarding packets through the network. With another suitable arrangement, controller server 18 provides flow tables 28 to switches 28 during setup operations.

Regardless of whether controller server 18 provides switches 14 with flow table entries in advance or in real time in response to receipt of a packet from a switch, once each switch 14 has been provided with the flow table entries, the flow table entries will ensure that the switches 14 will forward the packets along a satisfactory path through the network.

The ability of controller server 18 to provide switches 14 with appropriate flow table entries relies on knowledge of the topology of the network. Controller server 18 may obtain network topology information by gathering information from switches 14 on the types of connections each of switches 14 has made with nearby switches. This information may then be processed by controller server 18 to determine the topology of the network. For example, controller server 18 can determine whether switches 14 are organized in clusters that are separated by network equipment that is not configured by controller server 18.

Figure 10:
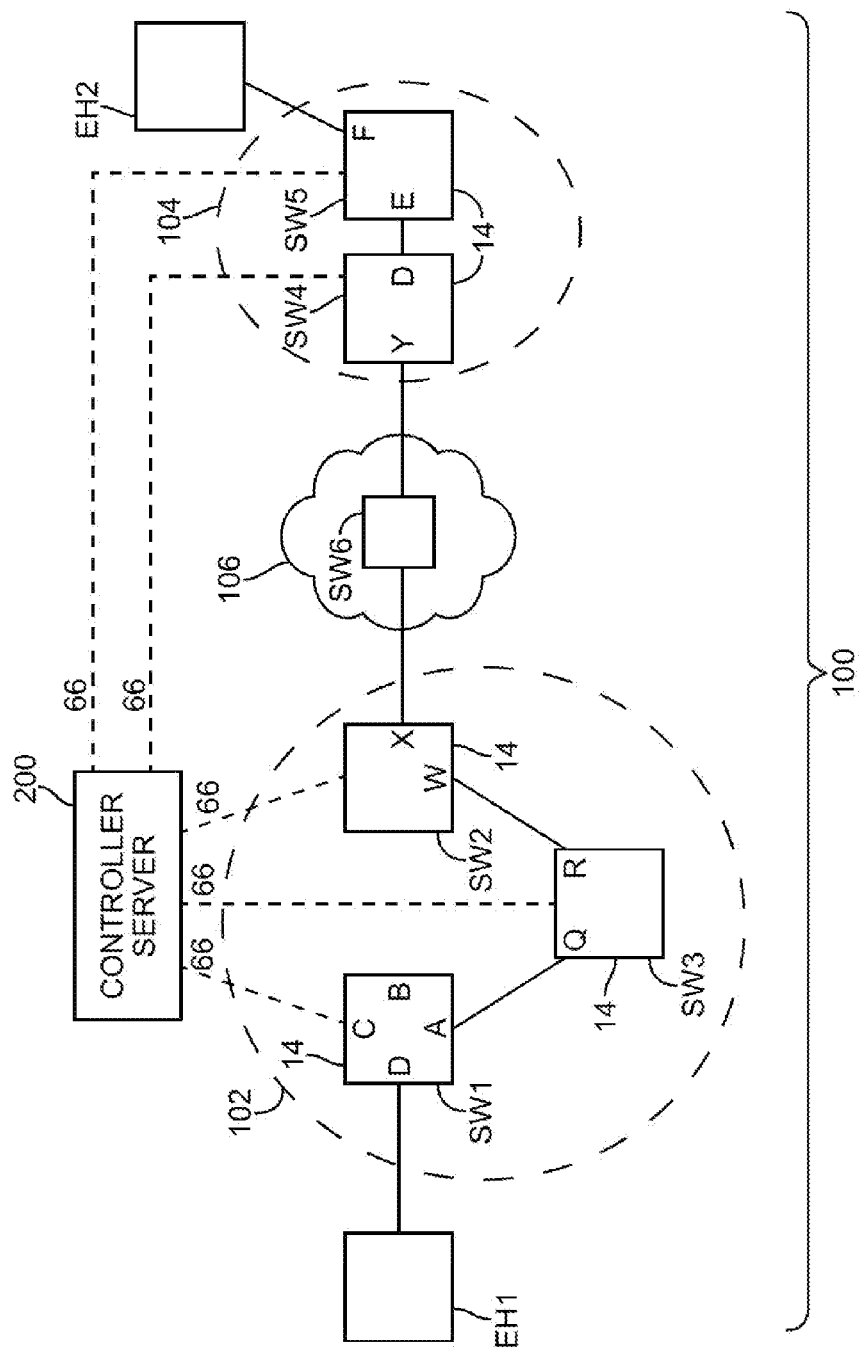
FIG. 10 is a diagram of a network showing how switch clusters containing controller clients that communicate with a controller server may be separated by switches that do not communicate with the controller server in accordance with an embodiment of the present invention.

An illustrative network 100 of the type that may contain switches 14 that are configured by controller server 200 and switches (e.g., switch 106) that are not configured by controller server 200 is shown in FIG. 10. Network 100 may include end hosts such as end hosts EH1 and EH2. Network 100 may also include switches such as switches 14 that are configured by controller server 200. Switches 14 contain controller clients that communicate with controller server 200, so switches such as switches 14 are sometimes referred to herein as client switches. Switches such as switch 106 do not contain a controller client that communicates with controller server 200 and are not configured by controller server 200. Switches such as switch 106 are therefore sometimes referred to as switches without controller clients (non-client switches).

As shown in FIG. 10, client switches 14 in network 100 may be organized into client switch clusters that are separated by networks comprised of non-client switches such as switch 106. Client switch clusters may sometimes be referred to herein as switch clusters or clusters. In the example of FIG. 10, switches SW1, SW2, and SW3 form client switch cluster 102 and switches SW4 and SW5 form client switch cluster 104. Client switch clusters 102 and 104 may be separated by network 106 (e.g., packets sent between switch cluster 102 and switch cluster 104 must traverse network 106). Network 106 may include one or more non-client switches configured in a network topology that routes packets between switch cluster 102 and switch cluster 104. For illustrative purposes, network 106 is shown in FIG. 10 as a single non-client switch SW6, but, in general, network 106 may include numerous switches. The example of FIG. 10 is merely illustrative.

When network 100 is first created, controller server 200 may require initialization of connections to the client switches in network 100 (e.g., controller server 200 may require address information from the client switches). The address information of controller server 200 may be well known, and client switches SW1, SW2, SW3, SW4, and SW5 may initiate TCP/IP connections with controller server 200 over network paths 66. Controller server 200 may maintain independent Transmission Control Protocol/Internet Protocol (TCP/IP) connections with each client switch. These connections, which may pass through one or more switches in the network, are illustrated as paths 66 in FIG. 10 and FIG. 6. Controller server 200 may communicate with client switches SW1, SW2, SW3, SW4, and SW5 of network 100 using the independent TCP/IP connections with each client switch.

Figure 11:
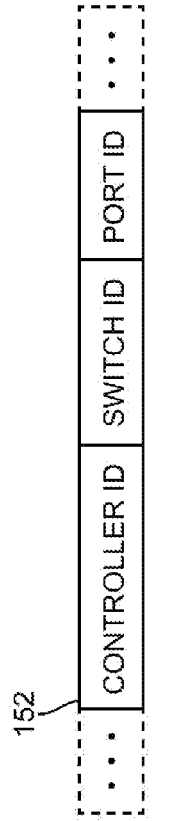
FIG. 11 is a diagram of an illustrative switch features reply message in accordance with an embodiment of the present invention.

Controller server 200 may communicate with each switch in network 100 to obtain information about available switch ports, switch port speed, and other switch characteristics. Client switches may respond with messages such as switch features reply message 150 of FIG. 11. As shown in FIG. 11, the switch features reply message 150 that is sent by each client switch may include fields containing information such as switch identification information (e.g., a switch identifier DPID that identifies the switch) and information on the ports of the switch (i.e., a port list of physical input-output ports).

Controller server 200 may issue commands to individual switches in network 100 that direct each switch to complete specific tasks. For example, to determine the direct links between switches in the network, controller server 200 may use the Link Layer Discovery Protocol (LLDP). The LLDP protocol may require client switches to send controller-generated messages out of specific ports. These messages may then be processed by controller server 200 to determine the topology of the network.

Figure 12:
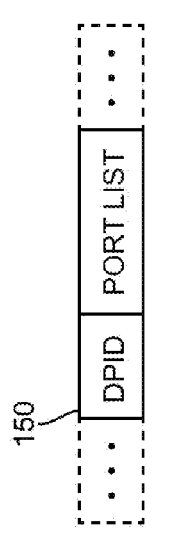
FIG. 12 is a diagram of an illustrative Link Layer Discovery Protocol (LLDP) message in accordance with an embodiment of the present invention.
Figure 13:
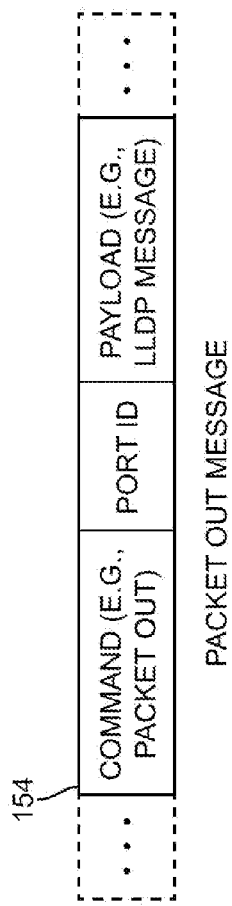
FIG. 13 is a diagram of an illustrative "packet out" message in accordance with an embodiment of the present invention.
Figure 14:
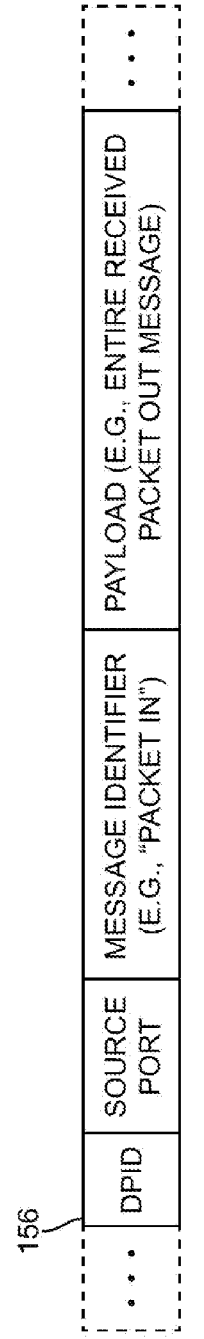
FIG. 14 is a diagram of an illustrative "packet in" message in accordance with an embodiment of the present invention.

As an example, controller server 200 may send messages to each client switch instructing the switch to send a controller-generated packet such as LLDP message 152 of FIG. 12 to a specific port on the switch. LLDP message 152 may contain fields with information such as the identification of controller server 200 (controller ID), the source switch (switch ID), and the source port (port ID). As an example, controller server 200 may send a "packet out" message 154 to switch SW1 that directs switch SW1 to send a controller-generated LLDP packet to port A on switch SW1. "Packet out" message 154 may contain fields with information such as the controller's command (e.g., "packet out"), the port to send the controller-generated packet to (e.g., port ID), the controller-generated packet (e.g., LLDP message), and other pertinent information.

Controller server 200 may instruct each client switch to forward all network packets from unmapped sources (e.g., switches that have not been mapped in the network topology) to the controller server. Switches may forward network packets to the controller server using messages such as "packet in" message 156. "Packet in" message 156 may include fields with information such as the source switch ID (e.g., source switch identifier DPID), source port, message identifier describing the type of message (e.g., "packet in"), and a payload (e.g., the packet received from an unmapped source). For example, an LLDP message received by switch SW3 of network 100 of FIG. 10 on port Q from unmapped switch SW1 may be forwarded from switch SW3 to controller server 200 using a "packet in" message 156 with source switch ID SW3, source port Q, message identifier "packet in," and the entire received LLDP message as the payload.

Non-client switches do not have an open TCP/IP connection with controller server 200 and will not recognize the controller identifier (controller ID) of LLDP messages 152 received from client switches. Non-client switches that receive LLDP messages generated by controller server 200 may not respond. Controller server 200 will not receive messages from non-client switches in response to controller-generated LLDP packets.

Using the information obtained from the client switches (e.g., "packet-in" messages containing LLDP messages from each switch), controller server 200 may generate databases describing the topology of the network. For example, controller server 200 may generate network topology data structure (database) 250 for network 100, as shown in FIG. 15. Each entry in network topology data structure 250 contains information describing a pair of connected network client switches. For example, the first entry of network topology data structure 250 represents how source port A of switch SW1 is connected to destination port Q of switch SW3, and the second entry of network topology data structure 250 represents how source port Q of switch SW3 is connected to destination port A of switch SW1.

Network topology data structure 250 may be formed from a table, multiple tables, arrays, trees, or one or more other data structure suitable for storing network topology information. Arrangements in which network topology data structure 250 is formed from a table (i.e., a network topology table) are sometimes described herein as an example. This is, however, merely illustrative. Any suitable type of data structure(s) may be used in forming network topology data structure 250. Network topology data structure(s) 250 may be stored at a single location. If desired, network topology data structure 250 may be stored at multiple locations or formed from data structures stored at multiple locations. For example, network topology data structure 250 may be partitioned into two or more sections that are stored at two or more controller servers 200.

To assist controller server 200 in creating flow table entries for network switches 14, controller server 200 may provide table 250 with information on the clustering of client switches. Controller server 200 may use information obtained from each client switch along with information in the network topology data structure to determine how the client switches are clustered. In particular, controller server 20 may determine how the client switches are organized into independent clusters (islands) of switches separated by non-client switches. Controller server 200 may determine that switches SW1, SW2, and SW3 of network 100 belong to a first cluster I, and that switches SW4 and SW5 belong to a second cluster II. As shown in FIG. 16, controller server 200 may update network topology data structure 250 to reflect the clustering of switches (i.e., to assign cluster identifiers to the switch entries that indicate which cluster each switch is located in).

During operation, network switches 14 may use their control resources (e.g., control unit 24 of FIG. 1, etc.) to collect information about end hosts that communicate with the switch. This information may be stored in databases on the switches. These databases, which are sometimes referred to as per-switch forwarding databases, reflect which end hosts are associated with each port in each switch. A respective per-switch forwarding database may be stored in storage at each switch.

In the example of FIG. 17, per-switch forwarding databases 260 for switches SW1, SW2, and SW3 of network 100 contain routing information for end hosts EH1 and EH2 that is specific to each switch. For example, per-switch forwarding database 260 for switch SW1 may contain an entry that reflects that traffic for end host EH1 is handled using port D and an entry that reflects that traffic for end host EH2 is handled using port A. Per-switch forwarding database 260 for switch SW2 may contain an entry that reflects that traffic for end host EH1 is handled using port Q and an entry that reflects that traffic for end host EH2 is handled using port R. Per-switch forwarding database 260 for switch SW3 may contain an entry that reflects that traffic destined for end host EH1 is handled using port W and an entry that reflects that traffic destined for end host EH2 is handled using port X. The tables of FIG. 10 are merely illustrative. Per-switch forwarding databases 260 for switches SW1, SW2, and SW3 may contain routing information for many end hosts and switch ports. This information may change in response to the addition or removal of end hosts.

To assist in determining the topology of network 100 and using this information in generating flow table entries, controller server 200 may request that switches 14 provide controller server 200 with information regarding the connections between clusters. For example, to identify a network path between end host EH1 in cluster I and end host EH2 in cluster II, network controller 200 may obtain information from switches 14 regarding the network connection between cluster I and cluster II.

In particular, controller server 200 may use per-switch forwarding databases from each client switch along with information from network topology data structure 250 to identify the network connections between clusters. The cluster connection information may then be stored in databases such as per-cluster forwarding databases 270 of FIG. 18. In the example of FIG. 18, per-cluster forwarding database 270 for cluster I indicates that traffic for end host EH1 uses port C of switch SW1 and traffic for end host EH2 uses port X of switch SW2. Per-cluster forwarding database 270 for cluster II indicates that traffic for end host EH1 uses port Y of switch SW4 and traffic for end host EH2 uses port F of switch SW5.

The messages and tables described in connection with FIGS. 11-18 may be used to identify client switch clusters and create per-cluster forwarding databases for generating flow table entries for each client switch. The flow chart in FIGS. 19A and 19B illustrates a process that may be used in identifying client switch clusters and generating per-cluster forwarding databases for the identified clusters.

Figure 19A:
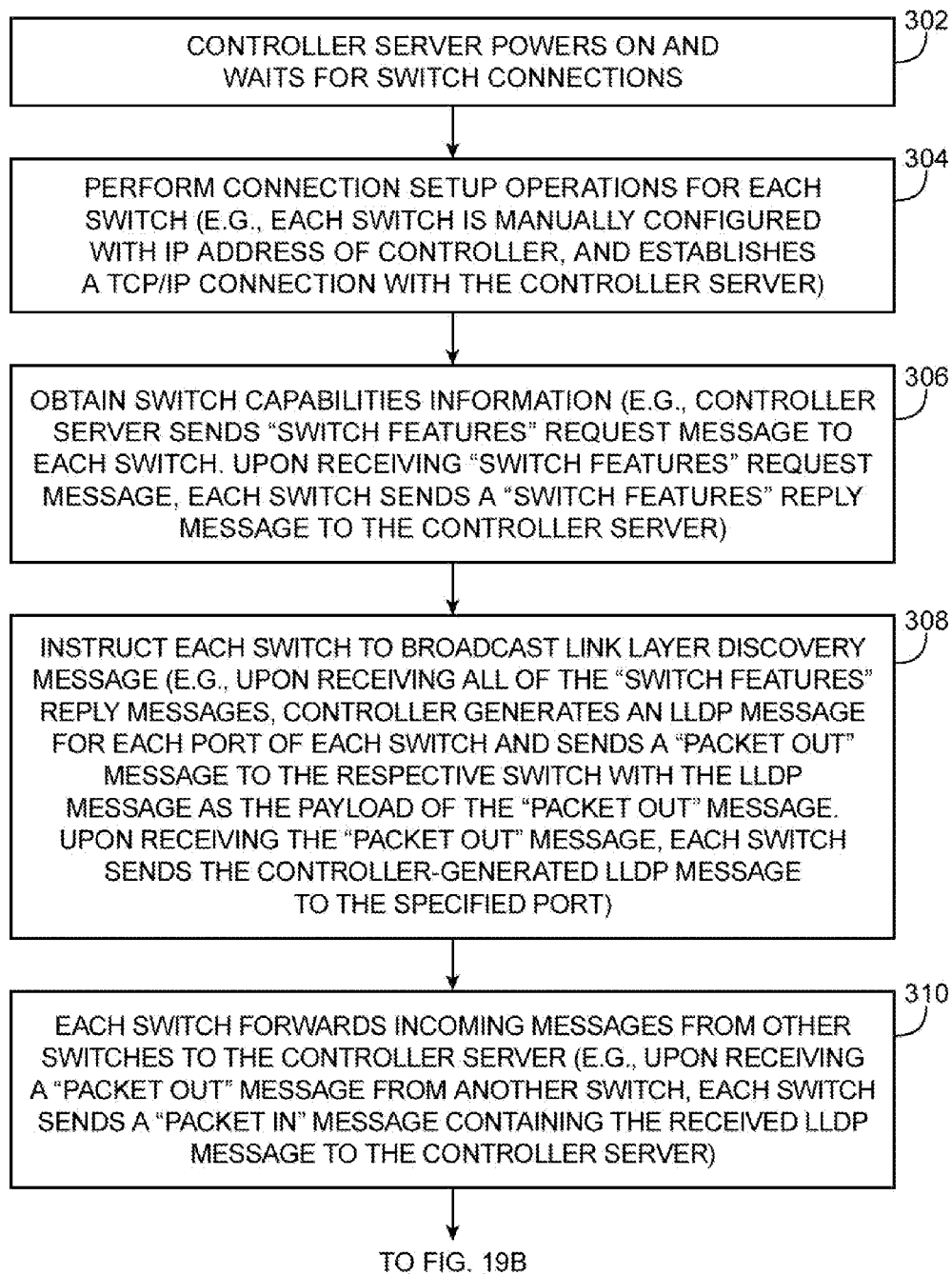
FIGS. 19A and 19B contain a flow chart of illustrative steps involved in network setup and topology discovery in accordance with an embodiment of the present invention.
Figure 19B:
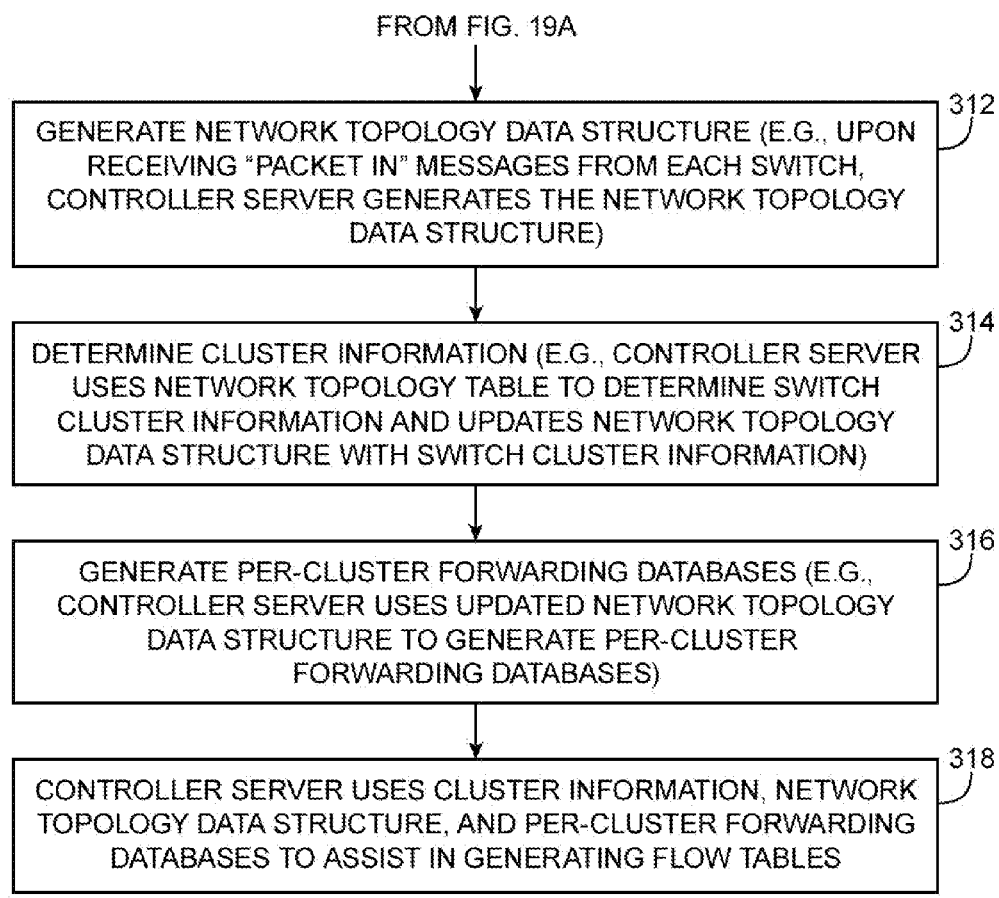

During the operations of initialization step 302 of FIG. 19A, controller server 200 may power on and wait for incoming connections from client switches 14.

During the operations of connection setup step 304, after each client switch is manually initialized with the internet protocol (IP) address of the controller, each individual client switch may initiate and establish a separate TCP/IP connection with the controller server. The established TCP/IP connections with the controller server may be left open until the client switch is disconnected from the network or the controller server terminates the connection.

During the operations of step 306, controller server 200 may obtain information regarding the capabilities of each client switch (e.g., a switch identifier and a list of physical ports). To obtain switch capabilities information, controller server 200 may send a "switch features" request message to each client switch. Upon receiving a "switch features" request message, each client switch may send a "switch features" reply message 150 containing the requested information to controller server 200.

During the operations of step 308, upon receiving all of the "switch features" reply messages, controller server 200 may generate a link layer discovery protocol (LLDP) message 152 for each port of each client switch. Each LLDP message may contain information such as the controller server's identifier (controller ID), the source client switch (switch ID), and the source client port (port ID). For example, an LLDP message for port A of client switch SW1 may have a switch ID of "SW1" and port ID of "A." Controller server 200 may then send a "packet out" message 154 with port ID set to the source client port of the LLDP message and the respective LLDP message as the payload. Each client that receives a "packet out" message may send the payload of the received "packet out" message (e.g., the respective LLDP message) to the port specified by the port ID field of the received "packet out" message.

During the operations of step 310, upon receiving an LLDP message from another client switch, each client switch may forward the received LLDP message to controller server 200. Each client switch may forward the LLDP message as the payload of a "packet in" message 156.

During the operations of step 312, controller server 200 may use the received "packet in" messages 156 from each client switch of network 100 to generate network topology data structure 250. As an example, an LLDP message that controller server directed switch SW1 to send out through port A (step 308) may be received by switch SW3 through port Q and forwarded to controller server 200 (step 310). Controller server 200 may then add an entry to network topology data structure 250 showing that source port A of source switch SW1 is connected to destination port Q of destination switch SW3 (FIG. 15).

During the operations of step 314, controller server 200 may produce information identifying the clusters of switches 14 in network 100 using network topology data structure 250. Controller server 200 may then update network topology data structure 250 with this cluster information.

During the operations of step 316, controller server 200 may generate per-cluster forwarding databases using updated network topology data structure 250 and the per-switch forwarding databases.

During the operations of step 318, controller server 200 may use updated network topology data structure 250 and per-cluster forwarding databases to assist in generating flow tables for each client switch.

Figure 20:
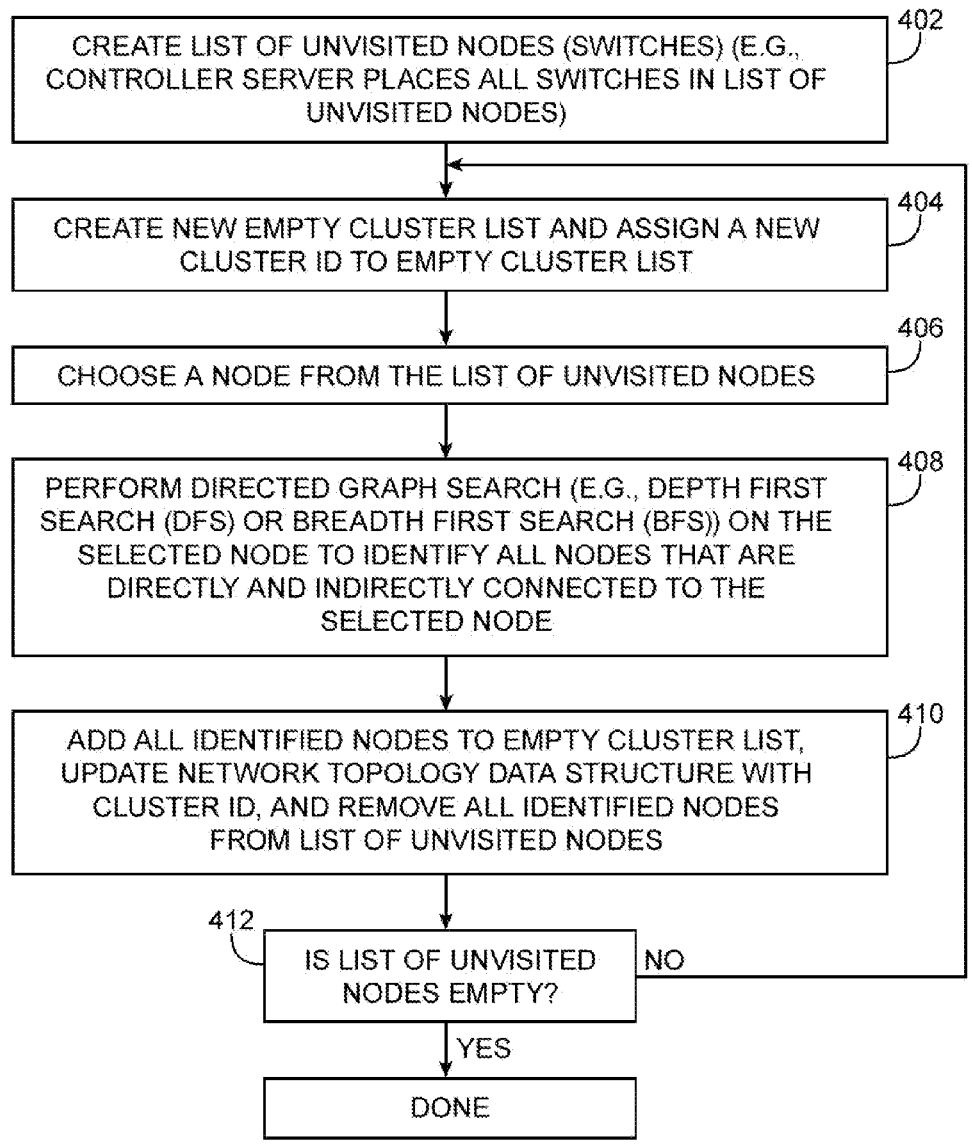
FIG. 20 is a flow chart of illustrative steps involved in obtaining cluster information in accordance with an embodiment of the present invention.

To determine the cluster information in step 314 of FIG. 19B, controller server 200 may follow the steps shown in the flowchart of FIG. 20.

During the operations of step 402, controller server 200 creates a list of unvisited switches (nodes) and places all client switches in the list of unvisited switches. In step 404, controller server 200 creates a new empty cluster list and assigns a new cluster ID to the new empty cluster list (e.g., the first empty cluster list may be assigned cluster ID I). The network topology data in data structures such as data structure 250 corresponds to a graph in which graph nodes represent switches and graph edges represent links between switches. The graph may be a directed graph (i.e., a graph in which the links are directional) or an undirected graph (i.e., a graph in which the links represent connections between switches, but not the directions of the links). In steps 406 and 408, controller server 200 chooses a switch from the list of unvisited switches and performs a graph search on the chosen switch (i.e., a directed graph search or an undirected graph search) to identify all switches that are directly and indirectly connected to the selected switch. The graph search may be a depth first search (DFS), a breadth first search (BFS), or any other suitable graph search in which the connections between switches serve as graph edges and the switches serve as graph nodes. In step 410, controller server 200 adds the switches identified by the graph search to the current empty cluster list, updates network topology data structure 250 to reflect the identified cluster, and removes the identified switches from the list of unvisited switches. In step 412, the controller server checks whether all client switches have been assigned a cluster ID (i.e., controller server 200 determines whether the list of unvisited switches is empty). Until the list of unvisited switches is empty, controller server 200 repeats steps 404 to 412.

As an example, controller server 200 may select switch SW1 from the list of unvisited switches created from network 100. Controller server 200 may perform a DFS search on switch SW1 that may identify switches SW2 and SW3 as being connected to SW1. Switches SW1, SW2, and SW3 may then be assigned cluster ID I, and network topology data structure 250 and the list of unvisited switches may be updated accordingly. The list of unvisited switches for network 100 may still have members (e.g., SW4 and SW5 may still be in the list). Controller server 200 may therefore select SW4 and perform a DFS search on SW4, identifying SW5 as being connected to SW4. Controller server 200 may then assign cluster ID II to SW4 and SW5 and update network topology data structure 250 and the list of unvisited switches. The use of distinct cluster IDs for each cluster reflects how the clusters of client switches are isolated from one another by interposed non-client switches. Following the identification of all switches in cluster II, the list of unvisited switches will be empty (i.e., all clusters will have been identified in this example).

Figure 21:
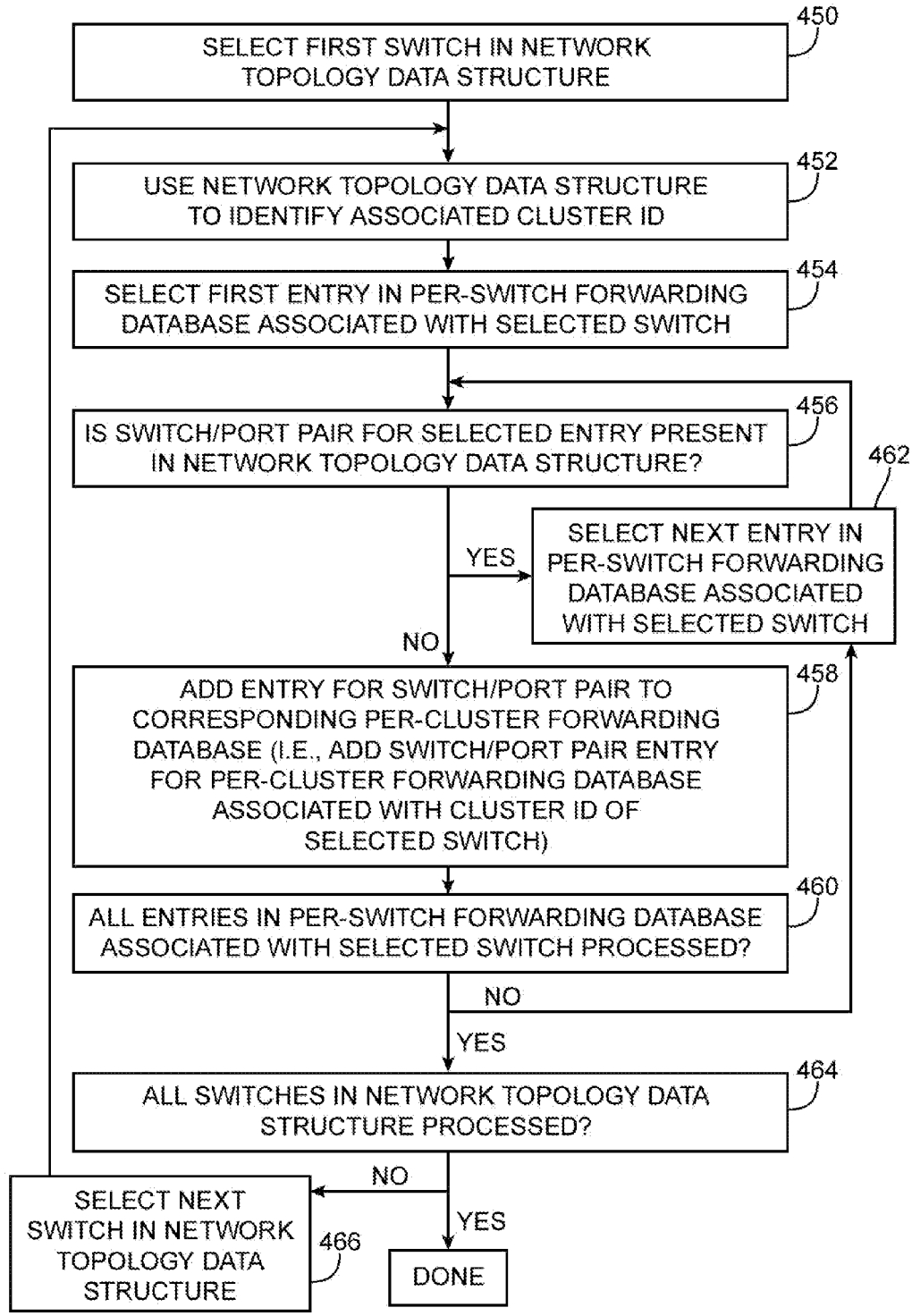
FIG. 21 is a flow chart of illustrative steps involved in generating per-cluster forwarding databases in accordance with an embodiment of the present invention.

To generate per-cluster forwarding tables 270 during the operations of step 316, controller server may follow the steps illustrated in the flow chart of FIG. 21.

During the operations of step 450, controller server 200 may select a first switch in the network topology data structure.

During the operations of step 452, controller server 200 may use network topology data structure 250 to determine the cluster ID of the selected switch (e.g., switch SW1 belongs to cluster ID I).

During the operations of step 454, the controller server may select the first entry in per-switch forwarding database 260 associated with the selected switch (e.g., the first entry of per-switch forwarding database 260 associated with switch SW1).

During the operations of step 456, the controller server may search network topology data structure 250 for an entry containing both the selected switch and the port described in the selected entry of per-switch forwarding database 260 (e.g., the controller server may search network topology data structure 250 for entries containing either a source switch-port pair or destination switch-port pair that matches the switch-port pair "switch SW1, port D" from the per-switch forwarding database). In this way, controller server 200 processes the per-switch forwarding table entries by attempting (for each per-switch forwarding table entry) to match a switch-port pair associated with that entry with a corresponding switch-port pair in an entry in the network topology data structure.

If network topology data structure 250 contains the selected switch and port pair (i.e., the switch is connected to another client switch on the specified port), controller server 200 may select the next entry in the per-switch forwarding database 260 associated with the selected switch (as described in step 462) and return to step 456.

During the operations of step 458, in response to a determination by controller server 200 that network topology data structure 250 does not contain the selected switch-port pair (i.e., the switch is connected to either an end host or a non-client network on the specified port), controller server 200 may add an entry to per-cluster forwarding database 270 associated with the cluster ID of the selected switch. In other words, in response to a determination that the switch-port pair associated with an entry in the per-switch forwarding database entry does not correspond to a switch-port pair in the network topology data structure, that switch-port pair is added to an appropriate per-cluster forwarding database. The entry added may include the destination host from the selected entry of per-switch forwarding database 260 associated with the selected switch. The entry added may include the selected switch and port pair. For example, network topology data structure may not contain the switch and port pair "switch SW1, port D." Controller server 200 may add an entry to per-cluster forwarding database 270 for cluster I with the information "end host EH1, switch SW1, port D." The entry added may be used in generating flow table entries that forward network traffic in cluster I that is destined for end host EH1 to port D of switch SW1.

During the operations of step 460, the controller server may determine whether all of the entries in per-switch forwarding database 260 associated with the selected switch have been analyzed during the operations of step 456 and step 458. If unprocessed entries remain, controller server 200 may perform the operations of step 462 (e.g., select the next entry in per-switch forwarding database associated with the selected switch) and return to step 456.

During the operations of step 464, controller server 200 may determine whether all of the client switches in network topology data structure 250 have been processed in steps 452 through 460. If unprocessed switches remain, controller server 200 may perform the operations of step 466 (e.g., controller server 200 may select the next remaining switch in network topology data structure 250) and return to step 452.

The foregoing is merely illustrative of the principles of this invention and various modifications can be made by those skilled in the art without departing from the scope and spirit of the invention.

What is claimed is:

1. A method of identifying clusters of switches in a network, wherein the switches in the clusters have respective controller clients and are controlled by an associated controller server and wherein the clusters of switches are isolated from each other by at least one intervening switch that is not controlled by the controller server, the method comprising:
   with the controller server, generating a network topology data structure for the network;
   with the controller server, processing entries in the network topology data structure to identify the clusters, wherein the at least one intervening switch forwards network packets between the clusters of switches;
   with the controller server, assigning cluster identifiers to each entry that correspond to the clusters;
   with the controller server, generating per-cluster forwarding databases from the assigned cluster identifiers; and
   with the controller server, providing forwarding tables for the switches based on the per-cluster forwarding databases.

2. The method defined in claim 1 wherein processing the entries comprises performing graph searches on entries in the network topology data structure.

3. The method defined in claim 2 wherein the entries in the network topology data structure include source switch and destination switch information for each of the switches in the clusters.

4. The method defined in claim 1 further comprising:
   with the controller server, obtaining information on switch capabilities for the switches in the clusters from the controller clients.

5. The method defined in claim 4 wherein obtaining the information on the switch capabilities comprises obtaining a list of physical ports present in each switch in each cluster.

6. The method defined in claim 5 wherein each switch in each cluster has an associated switch identifier and wherein obtaining the information on the switch capabilities comprises obtaining from each switch in each cluster the switch identifier for that switch and the port list in a switch features reply message.

7. The method defined in claim 6 wherein the network topology data structure comprises at least one network topology table.

8. The method defined in claim 6 wherein performing the graph searches on the entries in the network topology data structure comprises performing depth first searches on the entries in the network topology data structure.

9. The method defined in claim 6 wherein performing the graph searches on the entries in the network topology data structure comprises performing breadth first searches on the entries in the network topology data structure.

10. The method defined in claim 6 wherein performing the graph searches on entries in the network topology data structure comprises:
    performing a graph search on a first entry in the network topology data structure to identify a first cluster; and
    performing a graph search on an entry that remains in the network topology data structure following the graph search on the first entry to identify a second cluster.

11. The method defined in claim 10 wherein performing the graph search on the first entry in the network topology data structure comprises:
    with the controller server, creating a cluster identifier;
    with the controller server, selecting a switch from the network topology data structure;
    with the controller server, performing a graph search on the selected switch to identify directly and indirectly connected switches in the network that belong to a common one of the clusters; and
    with the controller server, assigning the new cluster identifier to each of the identified switches.

12. A method of using a controller server in a network to generate per-cluster forwarding databases for corresponding clusters of switches in a network, wherein the switches in the clusters have respective controller clients and are controlled by the controller server and wherein the clusters of switches are isolated from each other by at least one intervening switch that is not controlled by the controller server, the method comprising:
    with the controller server, generating a network topology data structure;
    with the controller server, obtaining a per-switch forwarding table for each client switch; and
    with the controller server, processing entries in the network topology data structure together with entries in the per-switch forwarding table to generate the per-cluster forwarding databases.

13. The method defined in claim 12 wherein processing the entries in the network topology data structure and the entries in the per-switch forwarding tables comprises:
    for each entry in the per-switch forwarding tables, in response to a determination that a switch-port pair associated with that entry does not match any switch-port pair in the network topology data structure, adding the switch-port pair associated with that entry to one of the per-cluster forwarding databases.

14. The method defined in claim 13 wherein attempting to match the switch-port pair comprises:
    attempting to match the switch-port pair with source and destination switch-port pairs in the network topology data structure.

15. The method defined in claim 14 wherein each entry in the network topology data structure includes an associated cluster identifier and wherein adding each switch-port pair that does not match any switch-port pair in the network topology data structure to the per-cluster forwarding database comprises:
    using the network topology data structure to identify a given one of the cluster identifiers that is associated with that switch-port pair;
    identifying an end host for that switch-port pair from the per-switch forwarding tables; and adding an entry with that switch-port pair and the identified end host to the per-cluster forwarding database associated with the given cluster identifier.

* * * * *